United States Patent [19]
La Porta et al.

[11] Patent Number: 5,473,679
[45] Date of Patent: Dec. 5, 1995

[54] SIGNALING SYSTEM FOR BROADBAND COMMUNICATIONS NETWORKS

[75] Inventors: Thomas F. La Porta, Thornwood, N.Y.; Malathi Veeraraghavan, Atlantic Highlands, N.J.

[73] Assignee: AT&T Corp., Murray Hill, N.J.

[21] Appl. No.: 164,514

[22] Filed: Dec. 9, 1993

[51] Int. Cl.[6] .................................................. H04M 11/00
[52] U.S. Cl. ..................... 379/201; 370/110.1; 370/58.1; 370/60.1; 370/73; 348/14; 348/12; 348/6; 379/207; 379/220; 379/221
[58] Field of Search .................................... 379/201, 207, 379/94, 220, 221, 112; 370/110.1, 58.1, 58.2, 60.1, 71, 73, 76; 348/14, 6, 7, 8, 12, 13

[56] References Cited

U.S. PATENT DOCUMENTS

| | | | |
|---|---|---|---|
| 4,565,903 | 1/1986 | Riley | 379/201 |
| 5,278,889 | 1/1994 | Papanicolaou et al. | 379/230 |
| 5,329,308 | 7/1994 | Binns et al. | 348/14 |

Primary Examiner—Jeffery A. Hofsass
Assistant Examiner—Parag Dharia
Attorney, Agent, or Firm—John A. Caccuro

[57] ABSTRACT

A network architecture is designed to allow a communications service subscriber to select a signaling provider independently of a) the transport carriers which control the local loops for particular communications services, and b) the providers of those services. Upon the establishment of a signaling connection from a subscriber's terminal device to the signaling provider's network, the latter requests those services from the service providers selected by the subscriber for delivery over the local loops of the transport providers.

22 Claims, 4 Drawing Sheets

| SUBSCRIBER'S ADDRESS | TRANSPORT/SERVICE PROVIDERS | | | | | | INCOMING SERVICES | | OUTGOING SERVICES | |
|---|---|---|---|---|---|---|---|---|---|---|
| | ACCESS | | EGRESS | | LONG DISTANCE | | | | | |
| | VOICE | MULTI MEDIA | VOICE | MULTI MEDIA | VOICE | MULTI MEDIA | CALL WAITING | VOICE MAIL | VOICE QUALITY | VIDEO QUALITY |
| SUBSCRIBER 1<br>201 949-2000 | LEC | MONMOUTH CABLE TV CO. | LEC | MONMOUTH CABLE TV CO. | AT&T | AT&T | YES | YES | HIGH | HIGH |
| SUBSCRIBER 2<br>212 234-6789 | TELE-PORT | LEC | TIME WARNER CABLE | LEC | US SPRINT | IRIDIUM | NO ..... | NO ..... | LOW ..... | LOW ..... |
| ... | ... | ... | ... | ... | ... | ... | ... | ... | ... | ... |
| SUBSCRIBER N<br>215 456-7890 | OXFORD VALLEY TV CO. | OXFORD VALLEY TV CO. | OXFORD VALLEY TV CO. | OXFORD VALLEY TV CO. | AT&T | AT&T | YES | NO | HIGH | HIGH |

FIG. 4

SIGNALING SYSTEM FOR BROADBAND COMMUNICATIONS NETWORKS

TECHNICAL FIELD

This invention relates to communication systems.

BACKGROUND OF THE INVENTION

For most communications services, prior art communications network architecture limits a subscriber's ability to freely select services and/or service providers. For example, most subscribers are constrained to receive their local communications services exclusively from the carrier e.g., a local phone company, or a cable television operator, serving the geographical area where those subscribers live. Thus, those subscribers are limited to the services provided by their serving local carrier(s) singly or in agreement with other carriers. For some other communications services, such as long distance or cellular communications services, subscribers typically have more freedom in the selection of service providers. However, the inflexibility of today's communications network architecture prevents subscribers from freely mixing and matching features from different carriers for a particular service. Thus, a problem of the prior art is a rigid communications architecture which does not allow subscribers to select feature and/or services from competing carriers on a call-by-call basis or on a subscription basis.

Another problem of the prior art is the inability of end-users who have access/egress facilities to multiple competing carriers to specify a particular carrier from which they want to receive incoming communications services.

SUMMARY OF THE INVENTION

We have realized that the root causes of the aforementioned prior art problems can be traced back to the logical dependency of end-user signaling systems on end-user switching points. Specifically, the end-user switching points originate, process and terminate signaling messages for end-user devices. Because of that dependency, the end points for user signaling are switching systems that are generally managed and owned by a single communications carrier, such as a Local Exchange Carder (LEC), a cellular communications provider or a cable television operator. Thus, the communication carrier that controls the local loop associated with the terminal device of a subscriber also controls the nature and type of signaling messages for all communications services received and requested by that subscriber over that loop. Hence, the subscriber is at the mercy of the loop-controlling communications carrier (transport provider) for the type of communications services and features available to that subscriber.

The present invention is directed to a communications network architecture in which, a subscriber is allowed to select a signaling provider independently of a) the transport carriers which control the local loops for particular communications services, and b) the providers of those services. In accordance with the principles of the invention, bidirectional signaling messages associated with communications services requested by, or destined for a subscriber's terminal device are sent unprocessed to a signaling provider selected by the subscriber. The signaling provider then requests those services from the service providers selected by the subscriber.

In a preferred embodiment of the invention, a user establishes a signaling connection to a node of a signaling provider of his or her choice via a transport provider network. The signaling provider node processes call setup signaling messages to determine the type of connections and services desired by the user. The signaling provider node then retrieves a profile associated with the terminal device or user-identification information contained in a signaling message. The profile identifies through a table lookup operation, the particular features and service providers selected by the user. Service providers are selected by a user either on a subscription basis or on a call-by-call basis. In the latter case, service provider identification information needs to be included in the call setup signaling message. Once the appropriate service providers have been identified, the signaling provider node initiates and transmits service request signals to each of the signaling nodes of those service providers networks to set up the appropriate connections for the user's call. If the services requested by the user are limited to information retrieval, the retrieved information is then delivered to the user by the service provider over the facilities of the access transport provider that is determined from the aforementioned table lookup operation.

If interactive conversational services are requested by the subscriber, the signaling provider of the subscriber communicates with the signaling provider of each called party to determine the selected transport provider for incoming communications services for each called party who has access/egress facilities to more than one transport provider. Once the egress transport provider is identified for each called party, the subscriber's signaling provider establishes the appropriate connection(s) between the subscriber and each called party over the local loop (and other loops, if needed) of the transport provider of each called party.

DETAILED DESCRIPTION

Figure 1:
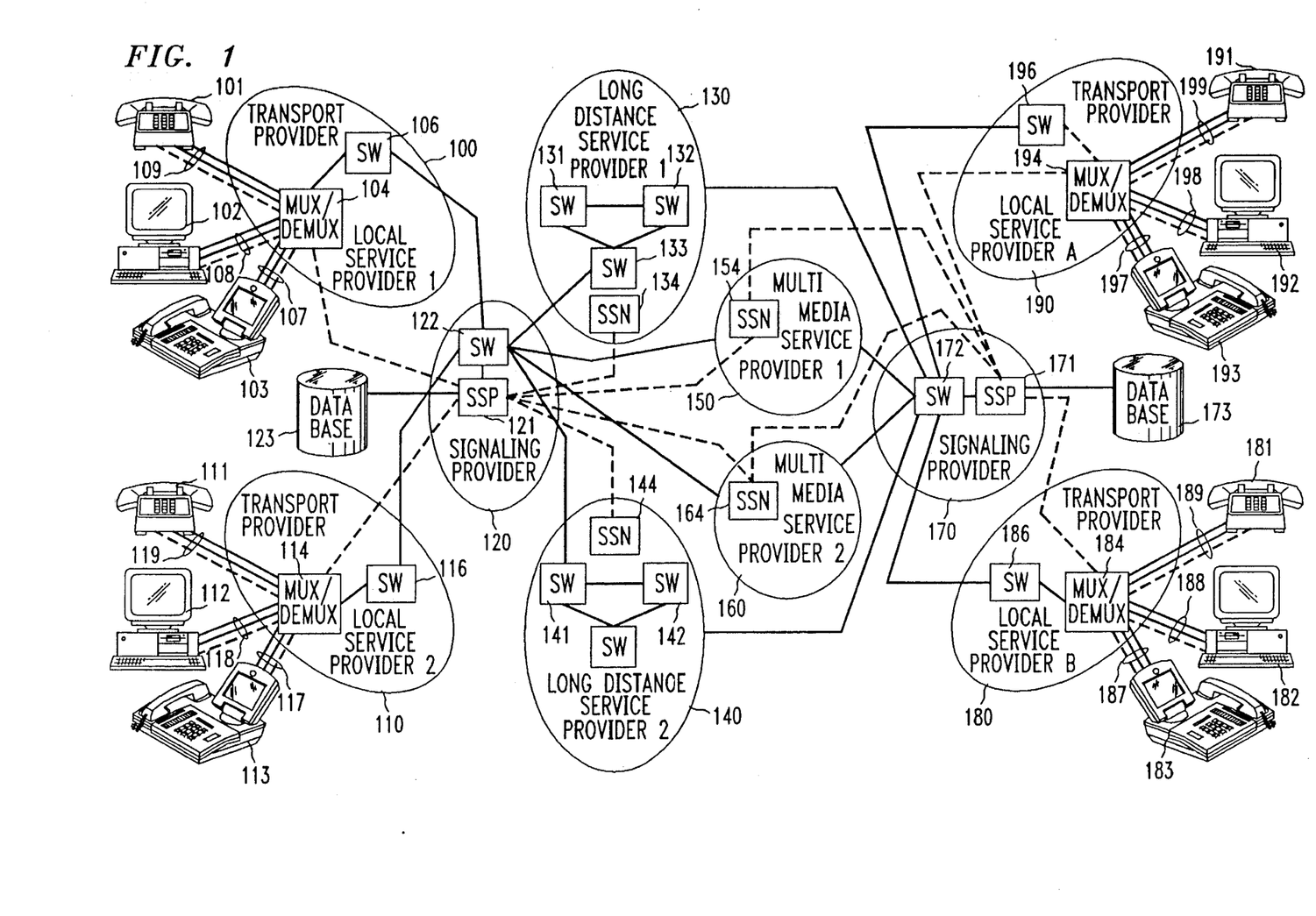
FIG. 1 is a block diagram illustrating a narrowband communications system embodying the principles of the invention.

FIG. 1 is a block diagram illustrating a narrowband communications system embodying the principles of the invention. The narrowband communications network illustrated in FIG. 1 is arranged to support Narrowband Integrated Services Digital Network (N-ISDN) standards from a signaling standpoint as well as from a transport perspective. Shown in FIG. 1 are transport provider and local service provider networks 100, 110, 180 and 190; long distance service provider networks 130 and 140; multimedia service provider networks 150 and 160; and signaling provider networks 120 and 170. Local Transport provider and local service provider networks 100, 110, 180 and 190 may be Local Exchange Carrier (LEC), cable television operator networks or cellular telephone networks or a combination of the above. One of the main characteristics of transport provider and local service provider networks 100, 110, 180 and 190 is that they provide the local loop to end-user devices at subscribers' premises.

In FIG. 1, user devices, such as telephone set 101, processor 102 and videophone 103 are connected to multiplexer/demultiplexer 104 via Basic Rate Interface (BRI) access/egress links 109, 108, 107, respectively. As is well known in the art, one of the N-ISDN transport standards is the Basic Rate Interface (BRI) specification which defines operating parameters for the transmission and reception of multiplexed digital information (user information and signaling information) over a two-wire or four-wire digital subscriber loop. Digital information received and transmitted over that loop is logically partitioned into two bearer (B) channels for user information, and one data (D) channel for signaling information. The logical partitioning of dam over those channels is commonly referred in the art as the "2B+D interface". That interface is also supported on access/egress links 117–119 that connect end-user devices 111–113 to multiplexer/demultiplexer 114. BRI access/egress links are also provided to mux/demux 184 and 194 for end-user devices 181–183 and 191–193, respectively. End-user devices 101 to 103, 111 to 113, 181 to 183 and 191 to 193 are ISDN-compatible devices that are arranged to packetize signaling information that is transmitted over the D channel to initiate communications with other ISDN-compatible devices. Multiplexer/demultiplexers 104–114 and 184–194 demultiplex signaling data received over the D channel and forward those signals to Signaling Nodes 121 and 171, respectively. User information destined for the end-user devices are transmitted to those devices via the B channels of the access/egress links. User information received from the end-user devices are routed by multiplexer/demultiplexers 104–114 and 184–194 to switches 106–116 and 186–196, respectively. The latter switches are software-driven, processor-controlled telephone systems designed to route calls either from one switch to another or to end-user devices. A well-known Local Service Provider switch is the AT&T No. 5ESS® which is described in *AT&T Technical Journal*, Vol. 64, No. 6, part 2, pp. 1305–1564, July/August, 1985.

Also shown in FIG. 1 is signaling provider network 120 (170) which includes a signaling service provider node (hereinafter called SSP) 121 (171) and a toll switch 122 (172). The latter switch, which may be implemented using, for example, an AT&T No. 4ESS®, is a software-driven, processor-controlled switching system which is arranged to communicate primarily with other toll switches or central office switches. SSP node 121 (171) performs three primary functions. First, SSP node 121 (171) is the access and egress point for all signaling messages received from, and destined for the end-user devices. Secondly, SSP node 121 (171) processes the received signaling messages by requesting from the appropriate service providers the necessary connections, based on the services requested by the users. Thirdly, it exchanges signaling messages with switches and processors in the network of FIG. 1 via other signaling nodes. While SSP node 121 (171) is illustrated in FIG. 1 as one physical node for the sake of simplicity, it is to be understood that SSP node 121 (171) may be composed of a plurality of interconnected nodes within signaling provider network 120, which can be arranged to switch signaling information according to ISDN-based signaling specific protocol.

FIG. 1 also discloses subscribers' database 123 (173) that is connected to SSP node 121 (171). Subscriber's database 123 (173) is a computer system with mass storage that contains addresses of particular service providers selected by each subscriber. A detailed description of the format in which information is stored in database 123 (173) is provided below.

Also shown in FIG. 1 are long distance service provider networks 130 (140) and multimedia service provider 150 (160). Long distance service provider network 130 (140) is comprised of toll switches 131 (141), 132 (142), and 133 (143) that are interconnected by transmission systems. Long distance service provider network 130 (140) is arranged to route calls to destination addresses received by Signaling Service Node 134 (144) (hereinafter called SSN) from SSP node 121 or 171. Similarly, multimedia service provider network 150 (160) receives destination addresses via SSN 154 (164). Multimedia service provider network 150 (160) may contain, for example, a repository of information such as data library, digitized imaging information, digital voice mail systems. Users wishing to get access to a particular type of stored information in multimedia service provider network 150 (160) provides addressing information to the signaling node of their signaling provider network which requests connection(s) to the targeted service from multimedia service provider network 150 (160) via SSN 154 (164).

Figure 2:
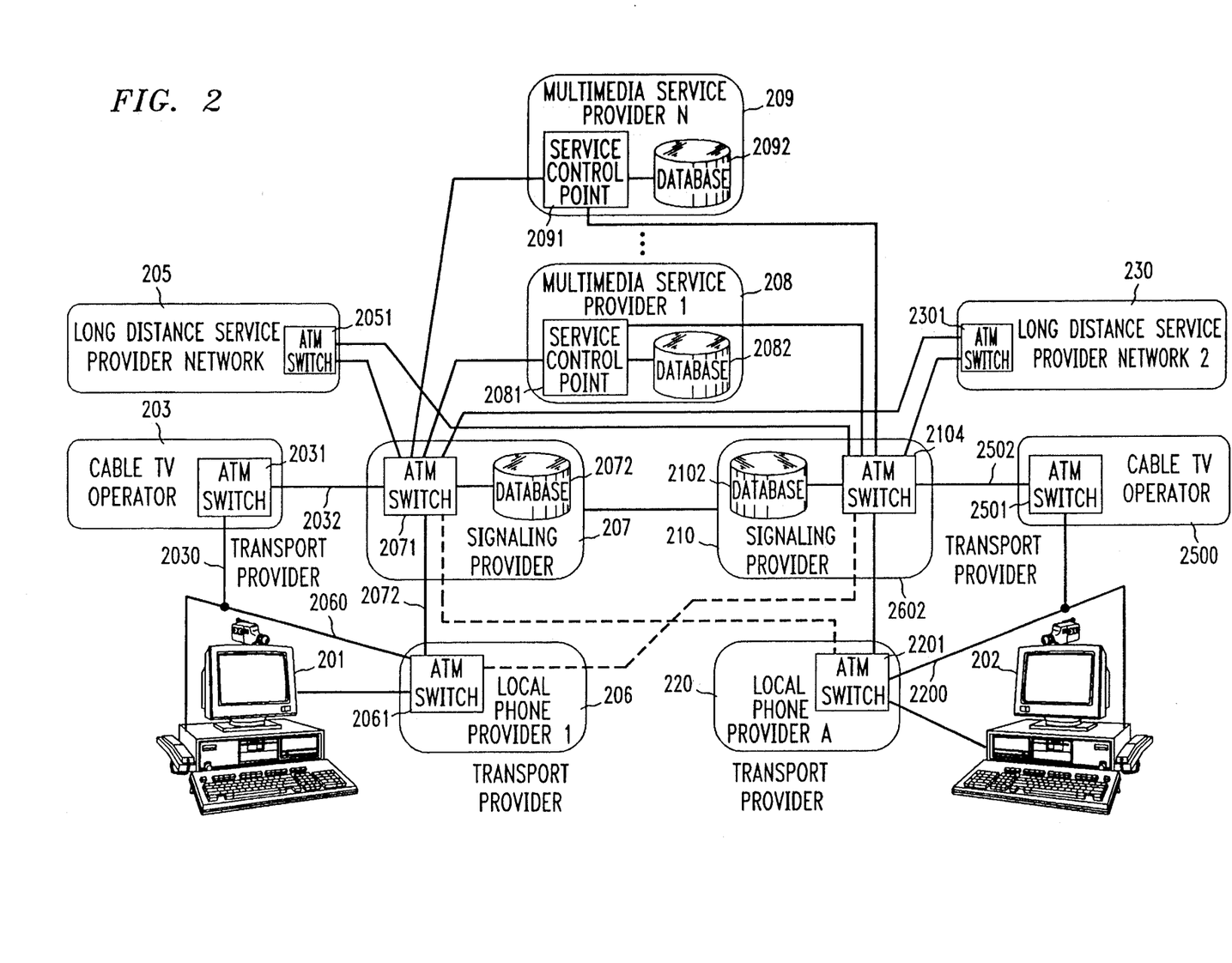
FIG. 2 shows a block diagram of a broadband communications system arranged in accordance with the principles of the invention.

FIG. 2 shows a block diagram of a broadband communications system arranged in accordance with the principles of the invention. In FIG. 2, end-user device 201 (202) is connected to two separate transport providers networks 206 and 203 (250 and 220). End-user device 201 is an integrated television and workstation which is equipped with a camera and a telephone set and which is arranged to process digital information in the form of voice data, image and video. The transport provider networks 206 and 203 (220 and 250) to which end-user device 201 (202) is connected, include Asynchronous Transport Mode (ATM) switches 2061 and 2031 (2501 and 2101), respectively. The latter switches are fixed-length cell (packet), digital, self-routing switching systems comprised of a switching fabric designed to route cells to logical channels indicated by their headers independently of the applications or media. ATM switches 2061 and 2031 (2501 and 2101) also include a) line cards (not shown) that are designed to terminate incoming ATM lines 2030 (2500) and 2060 (2200) connected to end-user device 201 (202), and b) trunk cards terminating trunk facilities 2032 and 2072 (2502 and 2072) that provide channel links between ATM switches 2031 (2101) and 2071 (2501). Also included in ATM switches 2031 (2501) and 2061 (2201) are components, such as multiplexing/demultiplexing modules and cross-connect hardware (not shown). Those components are arranged to multiplex lower speed input traffic (received from line cards connected to end-user devices 201 and 202) into the higher speed switching fabric which supports Virtual Path and Virtual Circuit connections as defined in CCITT broadband standards. In particular, the CCITT standards provide for a routing header to be prepended to each cell. The header of each cell is comprised of fields which store Virtual Channel Indicator (VCI) and Virtual Path Indicators (VPI) data. The VPI data identify a logical channel (that may be subdivided into lower bandwidth logical channels identified by VCI data) for a physical transmission path between two end points. The CCITT standards further proscribe for a lookup table to map input pair of VPI/VCI for each cell to a corresponding output pair of VPI/VCI before a cell is transferred from one channel link (between two switching points) to another. Thus, a virtual channel connection is defined as the association of all the individual channel links between each pair of switches as determined by the lookup tables in those switches. If, for example, signaling provider network 207 is selected by the user of device 201 as the "signaling agent" for all services requested by device 201, then all signaling messages initiated by or destined for end-user 201 are processed by signaling provider network 207.

In this example, virtual channel connections are used to transport users' real data (payload) as well as user signaling information to a signaling provider selected by a user. While protocols for signaling messages are still being defined by the international standard bodies, it is clear that the ATM Adaptation Layer (AAL) will be used for signaling messages. Thus, signaling messages will be carded as cells or frames in all signaling connections (point-point or multi-point) between an end-user device and ATM switches or any intelligent node in the network.

Also included in signaling providers networks 207 and 210 are databases 2072 and 2102, respectively. Those databases store signaling provider profile information which identifies the particular service providers and features selected by a subscriber. The type of information that is stored in databases 2072 and 2102 are described in further detail below.

Signaling provider networks 207 and 210 are arranged to a) receive signaling requests for access to services from end-user devices 201 and 202, and b) establish the appropriate connections to service providers networks selected by the users as determined by the end-user profiles. Although signaling provider networks 207 and 210 are shown as separate and independent networks, it is to be understood that the capabilities of signaling provider networks 207 and 210 can be included in multimedia service provider network 209 or 208 or long distance service provider network 205 or 230.

FIG. 2 also depicts long distance provider networks 205 and 230. The latter are communications systems comprised of ATM switches interconnected by transmission facilities to establish multimedia connections requested by users. For the sake of simplicity the ATM switches in long distance provider networks 205 and 230 are represented by a single switch 2051 and 2301, respectively. Multimedia connections that can be established over long distance networks 205 and 230 include audio (low and high fidelity), video (high and low bandwidth moving pictures) images (high bandwidth scanned images). These multimedia connections allow broadband multimedia telephony services to be provided between two locations. Long Distance Service provider network 205 (230) is also arranged to provide video and audio teleconferencing services between more than two locations.

Also illustrated in FIG. 2 are multimedia service provider networks 208 and 209. Multimedia service provider network 208 (209) includes a Service Control Point 2081 (2091) and a database 2082 (2092). Service Control Point 2081 (2091) is a preprocessor arranged to recognize the particular multimedia service requested by a user and to formulate a query that is launched to database 2082 (2092) to retrieve the particular set of information desired by the user. Hence, Service Control Point 2081 (2091) acts as an interface between signaling provider networks 207 and 210 and database 2082 (2092). Service Control Point 2081 (2091) may also provide the human interface between Database 2082 (2092) and the users. Database 2082 (2092) is a processor-controlled mass storage device that contains bandwidth-intensive digitized imaging information such as medical images (X rays and MRI data), movies, video mail messages, to name a few.

Figure 3:
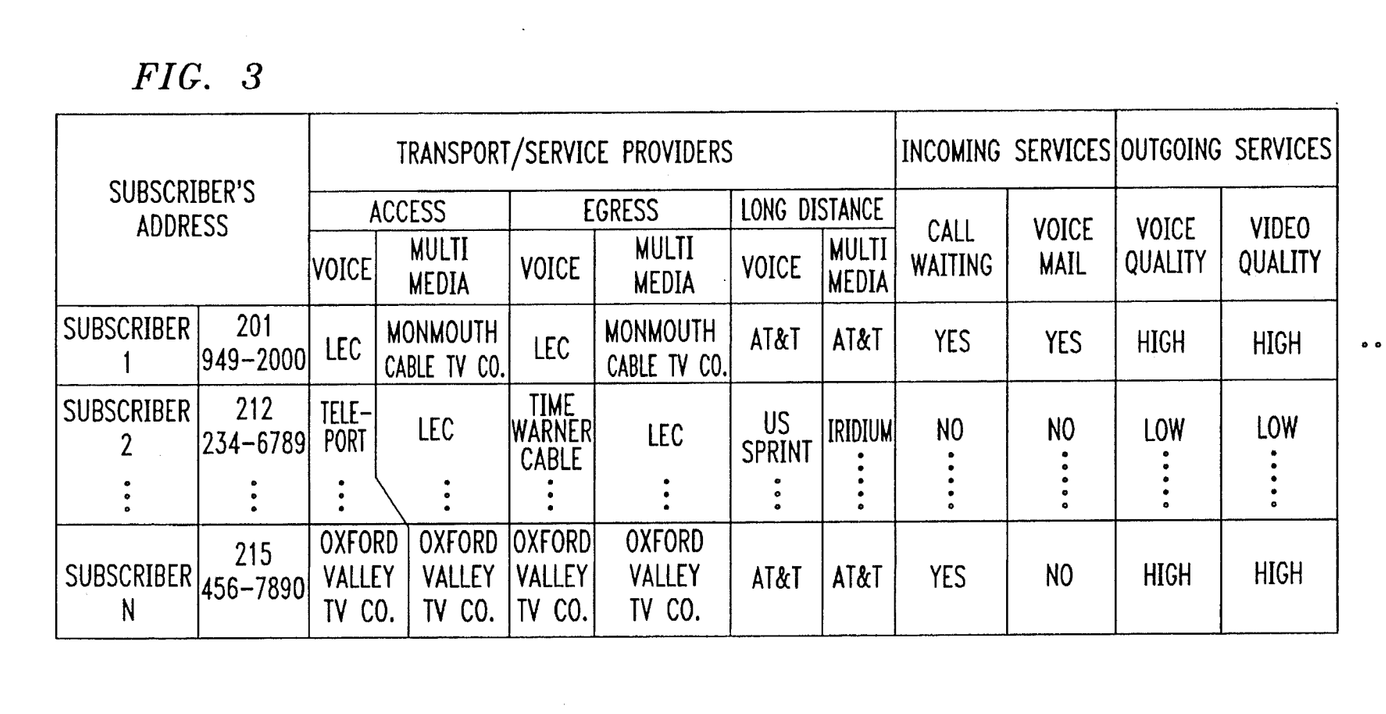
FIG. 3 shows a table illustrating subscribers' profiles that are stored in a signaling provider's network.

FIG. 3 shows a table illustrating subscribers' profiles that are stored in a signaling provider's network. The table of FIG. 3 contains information that is grouped under four major headers, namely, subscribers' addresses, transport/service providers, incoming services and outgoing services. The subscriber's address field typically identifies the telephone number of a subscriber. For data retrieval service applications, however, a physical port identification number may also be used as a subscriber's address.

Under the transport/service providers header are grouped three segments, namely, access, egress and long distance. Each segment comprises two fields, namely, voice and multimedia. The voice field in all three segments indicates the transport/service provider selected by a subscriber for communications services, such as conventional telephony, voiceband data, low bandwidth video services (less than 64 kilobits per second), to name a few. The multimedia field identifies a particular multimedia service/transport provider selected by a subscriber for communications services in which two bearer (B) channels are used for mixed voice, data and video applications. The access and egress segments identify the transport providers selected by a subscriber for receiving voice or multimedia communications services. For example, subscriber-1 has selected a) his/her Local Exchange Carder as the transport provider for access/egress local telephone services, and b) Monmouth Cable TV Company as the access/egress transport provider for multimedia services. The long distance segment identifies the service/transport provider selected by the subscriber for voice and multimedia long distance services. For example, subscriber-2 has opted to use US Sprint and Iridium as the long distance service provider for voice and multimedia services, respectively. Subscriber-1 has selected AT&T as the long distance service provider for both voice and multimedia services. The voice field in all three segments indicates the transport/service provider selected by a subscriber for communications services, such as conventional telephony, voiceband data, low bandwidth video services (less than 64 kilobits per second), to name a few. Multimedia Services refer to communications services in which two bearer (B) channels are used for mixed voice, data and video applications.

Also shown in FIG. 3 is the incoming services header. Under that header are grouped particular incoming call features selected by a subscriber. For the sake of simplicity, only call waiting and voice mail are shown as incoming call features in FIG. 3. It is to be understood, however, that other incoming call features, such as call forwarding, call restriction or call redirection can also be part of a subscriber's profile.

A subscriber can also include in his/her profile desired features for outgoing calls. Those features are illustrated in FIG. 3 as quality of service field for voice and video services. For example, subscriber-2 has opted for high quality for voice and video services. High quality for audio services in an N-ISDN environment may be implemented by dedicating an end-to-end full bearer channel—sixty-four (64) kilobits, as opposed to fifty-six (56) kilobits—for a regular telephone call. In a broadband environment, high quality audio services may require high fidelity characteristic for a call. High quality video in a broadband ISDN environment may require the use of High Definition Television (HDTV) standards for video connection, as opposed to the lower bandwidth-intensive National Television Standards Committee (NTSC) standards for a video call.

Figure 4:
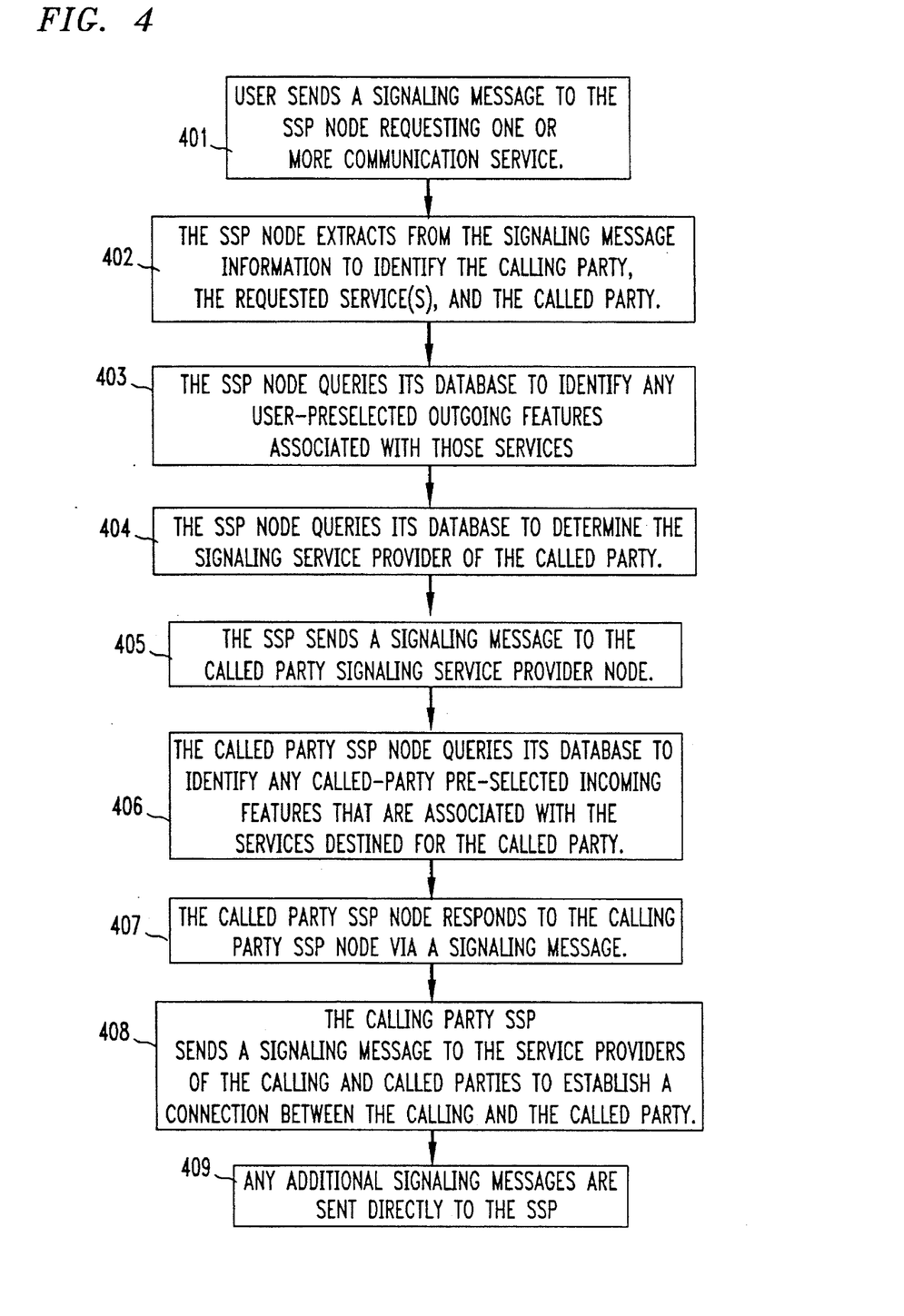
FIG. 4 is a flowchart describing the logical sequence of steps in methods for completing calls in the communications system of FIG. 1 or FIG. 2.

FIG. 4 is a flowchart describing the logical sequence of steps in an illustrative method for completing calls in the N-ISDN communications system of FIG. 1 and the broadband communications network of FIG. 2. That method is initiated in step 401, when a user at device 113 (of FIG. 1) or device 201 (of FIG. 2) for example, places a video call by dialing a called party number. The dialing of that number causes a signaling message to be launched to the signaling service provider pre-selected by the user. For example, in FIG. 1, a Q.931 or (alternatively) an ISUP information message is launched to the SSP node 121 of signaling service provider 120 via the signaling channel (D channel or SS7 link) of loop 117 and mux/demux 114. When the ISUP protocol is used, the signaling information message is carried in an Message Transfer Part (MTP) packet that allows the mux/demux 114 to route the signaling message directly to the SSP node 121. Similarly, when the Q.931 protocol is used, the signaling information message is carried in a "Link Access Procedures on the D channel" (LAPD) packet that allows the mux/demux 114 to route the signaling message to SSP node 121 using well-known frame relay switching techniques. As to FIG. 2, the signaling message is a Q.93B message that is included in one or more ATM cells that are routed to signaling provider 207 by transport provider network 203 or 206, based on the VPI/VCI of the cell(s).

Upon receiving the signaling message, the signaling provider network, in step 402, extracts information from the message to identify the calling party address or number, the requested services and the called party address or number. For example, in FIG. 1, SSP node 121 extracts the ISUP (Q.931) information message from the MTP (LAPD) packet and identifies the calling party, the requested services, and the called party. Similarly, in FIG. 2 the headers and ATM Adaptation Layer (AAL) related bits are discarded to identify the requested service(s) and the addresses of calling and called parties.

The signaling provider node proceeds, in step 403, to query an attached database to identify any particular features that are associated with the requested service(s) and that have been pre-selected by the user. In FIG. 1, SSP node 121 queries database 123 to determine whether the user has subscribed to any of those features. In FIG. 2, ATM switch 2071 queries database 2072 to inquire about the aforementioned features. This determination is based on the user's profile that is illustrated in FIG. 3. Thereafter, in step 404, the signaling provider of the called party is identified. Two alternate methods can be used to identify the signaling provider of the called party. The address of the signaling provider of the called party may be stored in database 123 of FIG. 1 or database 2072 of FIG. 2. Hence, a database search that uses the called party number as a key allows the signaling provider of the called party to be identified. Alternatively, information associated with the signaling provider of the called party may be included in the dialed number that is included in the signaling message received by signaling provider network 120 or 207. For example, if AT&T is the signaling provider of subscriber-1 in FIG.. 3, a caller who wants to direct a call to subscriber-1 will dial the number of subscriber-1 preceded by X288 where "X" is a digit between 0 and 9 and 288 corresponds to the letters A,T,T on the dialpad.

Once the signaling provider of the called party has been identified, the signaling provider network of the calling party, in step 405, sends a signaling message to the signaling provider of the called party indicating the requested services that are to be provided to the called party. In FIG. 1, SSP 121, sends an ISUP information message to the called party SSP node, in this case SSP 171. The message is carried in an MTP packet that is routed by intervening SSPs (if any) to SSP 171. In FIG. 2, ATM switch 2071 sends a B-ISUP message to the called party signaling provider, in this example ATM switch 2104 indicating the particular service that is destined for the called party. It is worth noting that step 405 is skipped when the calling and called parties have a common signaling provider.

In step 406, the signaling provider network queries its database to identify any pre-selected features that are associated with the services destined for the called party. For example, in FIG. 1, SSP node 171 queries database 173 to determine a) the egress transport provider selected by the called party and, b) the features pre-selected by the called party for incoming calls. Similarly, in FIG. 2, ATM switch 207 1 queries database 2072 to determine the associated features and the transport provider pre-selected by the called party.

In step 407, the called party signaling provider network responds to the the message of the calling party signaling provider network by identifying the address of the transport provider pre-selected by the called party and the particular features associated with the service(s) destined for the called party. Illustratively, in FIG. 1, SSP node 171 sends to SSP node 121 an ISUP information message which contains addressing information of the called party's transport provider and incoming call feature routing information, if any. As to FIG. 2, ATM switch 2104 sends a B-ISUP message to ATM switch 2071 containing addresses of the transport provider pre-selected by the called party for that service and any features associated with that service.

Upon receiving the signaling message from the signaling provider of the called party, the signaling provider of the calling party has all the information required to invoke the services requested by the caller and to deliver those services. Hence, in step 408, the signaling provider network of the calling party, sends a signaling message to the appropriate service providers of the calling and called parties to establish a connection between those parties. In FIG. 1, SSP 121, sends an information message to the access switch (in this example, access switch 116) of the transport provider to establish a connection between the calling party and the called party. The access switch 116 seizes the incoming line 117 from the calling party by generating an IAM message to end-user device 113. Access switch 116, then sends an IAM signaling message to switch 122 which, in turn, forwards that message to a switch of the long distance provider, say switch 133. The latter propagates the IAM message through the long distance service provider network to switch 172 and ultimately to egress switch 186. Alternatively, a direct connection via a link can be established between switches 116 and 133 and/or between switches 186 133 after exchanging signaling messages between those switches. After ISUP answer messages have been returned to access switch 116, the call is completed in a conventional manner.

The connection is established in FIG. 2 by ATM switch 2071 sending a) call request signaling messages to the pre-selected service providers associated with the services requested by the user, and b) connection request signaling messages to the transport provider pre-selected by the called party. For example, ATM switch 2071 can issue a) a call request to SCP 2081 of multimedia service provider 208, and b) a connection request to transport provider 220 to establish a video connection to user 202.

If additional signaling messages are needed to add, for example, a third party to the call, in step 409, those messages are sent directly to SSP node 121 or 171, of FIG. 1 or ATM switch 2071 or 2104 of FIG. 2, as described above.

The foregoing merely illustrates the invention. Those skilled in the art will be able to devise numerous arrangements which, although not explicitly shown or described herein, embody the principles of the invention and are within their spirit and scope.

We claim:

1. A boadband communications network comprising
   at least one signaling node of a signaling network for receiving signaling messages from a subscriber's device, said signaling network operating under the control of a signaling provider pre-selected by the subscriber;
   at least one service node for providing at least one communication service to the subscriber's device upon request from the at least one signaling node, said at least one service node operating under the control of a service provider selected by the subscriber; and
   a transport system of a first transport provider for delivering said signaling messages from the subscriber's device to the at least one signaling node, and a transport network of a second transport provider for delivering the at least one communications service from the at least one service node to the subscriber's device, said transport system and said transport network being logically independent of the signaling network of the signaling provider.

2. The invention of claim 1 wherein said service provider is selected by said subscriber on a call-by-call basis.

3. The invention of claim 1 wherein said service provider is pre-selected by said subscriber.

4. The invention of claim 1 further comprising
   means for exchanging signaling messages between said at least one signaling node and one or more other particular signaling nodes under the control of one or more other signaling providers pre-selected by one or more other subscribers associated with one or more other terminal devices to which said subscriber's device wants to communicate; and
   means for establishing one or more end-to-end routes for communications between said subscriber's device and said one or more other terminal devices.

5. The invention of claim 4 further comprising
   means for determining service providers for incoming communications pre-selected by said one or more other subscribers for the establishment of said one or more end-to-end routes.

6. The invention of claim 5 wherein said determining means includes
   means for identifying from a profile pre-stored in databases connected to the one or more other signaling nodes the addresses of the service providers.

7. The method of claim 1 wherein said transport system of said first transport provider operates logically independently of said signaling network.

8. In a broadband communication network, a method of completing a call initiated by a caller, said method comprising the steps of:
   establishing a signaling connection from an end-user device being used by the caller to a node of a particular signaling provider's network preselected by the caller, the connection being established via a node of a transport provider's network which a) operates logically independently of said signaling provider's network, and b) communicates unaltered said caller's signaling messages to the node of the signaling provider's network;
   processing said signaling messages in said signaling provider's node by determining from the signaling messages and pre-stored data a) at least one feature requested by the caller for said call, b) an associated provider of said feature, and c) a transport facility over which communications signals for said call and said feature are to be routed for said caller; and
   completing the call using said transport facility.

9. The invention of claim 8 wherein said communications service provider is selected by said caller on a call-by-call basis.

10. The method of claim 8 wherein the call is directed to one or more called parties, said method further comprising the steps of:
    establishing a signaling connection from the caller's signaling node to the one or more called parties' signaling nodes identified by address information in the signaling messages;
    determining at the one or more called parties' signaling nodes addresses of transport providers pre-selected by the one or more called parties for incoming communications services destined for said called parties; and
    completing the call using the caller's service provider communications facilities and the one or more called-parties-selected transport provider facilities.

11. The method of claim 8 wherein said transport facility is part of another transport provider's network.

12. A broadband communications network comprising:
    at least one signaling node within a signaling network of a signaling provider which receives signaling information associated with a communications service requested from an end-user device, said signaling information being received via facilities of a transport network which operates logically independently of said signaling network;
    means for retrieving from a database coupled to said at least one signaling node a profile associated with said end-user device, said profile storing data selected from a group which includes a) information regarding at least one service provider which offers said requested communications service, b) user-specific information associated with a user requesting said communications service from said end-user device, and c) at least one transport provider for delivery of said requested communication service; and
    communications means of said at least one service provider for delivering said requested communications service to said end-user device via facilities of a different transport network which also operates logically independently of said signaling network.

13. The invention of claim 12 further comprising
    means for identifying in said profile a feature associated with said requested communications service which is offered by another service provider; and
    communications means of said other service provider for delivering said feature to said end-user device as part of said requested communications service.

14. The invention of claim 12 wherein said at least one service provider is pre-selected for said end-user device.

15. The invention of claim 12 further comprising
    means for receiving in said at least one signaling node, as part of said signaling information, service provider selection data entered by a user in order to select said at least one service provider on a request-by-request basis.

16. The invention of claim 12 further comprising
    means for processing in said signaling network all signaling messages exchanged between at least one switch of said service provider and said end-user device for communications services requested from said end-user device and delivered by said service provider within a session.

17. The invention of claim 4 further comprising means for determining at least one transport provider pre-selected by said one or more other subscribers for receiving signals for incoming communications services wherein facilities of said at least one transport provider are used for the establishment of said one or more end-to-end routes.

18. A method of delivering a broadband communications service requested by a user, said method comprising the steps of:

receiving at a signaling provider's signaling network signaling information from an-end-user device via facilities of a transport network which operates logically independently of said signaling network;

ascertaining from pre-stored data and said signaling information at least one service provider which offers said requested communications service, and b) an access transport provider for delivering said requested communications service to said user; and exchanging signaling information between at least one signaling node of said at least one service provider and said at least one signaling node of said access transport provider to establish an end-to-end communications path for delivery of said requested communications service to said user.

19. The method of claim 18 wherein said requested communications service is a conversational service and wherein said method further includes the steps of:

identifying at least one egress transport provider for at least one other party associated with said conversational service establishing communications paths between said user and said at least one other party using facilities of said at least one access transport provider and said at least one egress transport provider.

20. The method of claim 18 wherein said access transport provider is selected from a group which includes a Local Exchange Carrier, (LEC) a cable television distribution company and a cellular communications carrier.

21. The method of claim 18 wherein said access transport provider is a Local Exchange Carrier, said signaling provider is an Interexchange Carrier and said transport network is part of a cellular carrier network.

22. The method of claim 18 wherein said signaling provider is selected from a group which includes a local exchange carrier, a cable television distribution company, a cellular communications carrier and an Interexchange carrier.

* * * * *